March 31, 1936.  C. R. DOTY  2,036,026

PRINTING SCALE

Filed Oct. 23, 1933  5 Sheets-Sheet 1

FIG.1.

March 31, 1936.     C. R. DOTY     2,036,026
PRINTING SCALE
Filed Oct. 23, 1933     5 Sheets-Sheet 3

INVENTOR
Charles R. Doty
BY
ATTORNEY

March 31, 1936.  C. R. DOTY  2,036,026

PRINTING SCALE

Filed Oct. 23, 1933  5 Sheets-Sheet 4

INVENTOR-
Charles R. Doty
BY
ATTORNEY-

March 31, 1936.    C. R. DOTY    2,036,026
PRINTING SCALE
Filed Oct. 23, 1933    5 Sheets-Sheet 5

INVENTOR
Charles R. Doty
BY
ATTORNEY

Patented Mar. 31, 1936

2,036,026

UNITED STATES PATENT OFFICE 2,036,026

PRINTING SCALE

Charles R. Doty, Binghamton, N. Y., assignor to International Business Machines Corporation, New York, N. Y., a corporation of New York Application October 28, 1933, Serial No. 695,587

18 Claims. (Cl. 265—5)

This case relates to combined weighing and recording scales.

The object in general is to provide novel means for setting recording means under control of weighing mechanism.

Further, the object is to move recorder members under control of mechanical load translating disks in differential steps corresponding to but greatly magnified in relation to the differential steps of movement of the disks.

Still further, the object is to provide means for positively arresting recorder members under control of load translating disks without imparting shock to said disks.

Another object is to control recording members by stepped load translating disks through an intermediate stop device which has steps of progressively different heights corresponding to the steps of the disks.

Still another object is to provide an intercontrol between the stepped load translating disks and weighing mechanism which will have no reactive influence on operation of the weighing mechanism.

An object is also to provide driving means for the recorder independent of the driving means for the load translating disks and to selectively lock the driving means in accordance with the setting of the disks.

A further object is to delay operation of the recorder for a prescribed interval following setting of the translator disks to insure the latter being at true load point before exercising control of the recorder.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

The invention is herein disclosed in connection with weighing mechanism such as shown in Patent No. 1,870,233, although it will be understood that the principles of the invention may be applied to any other suitable weighing mechanism.

Figure 1:
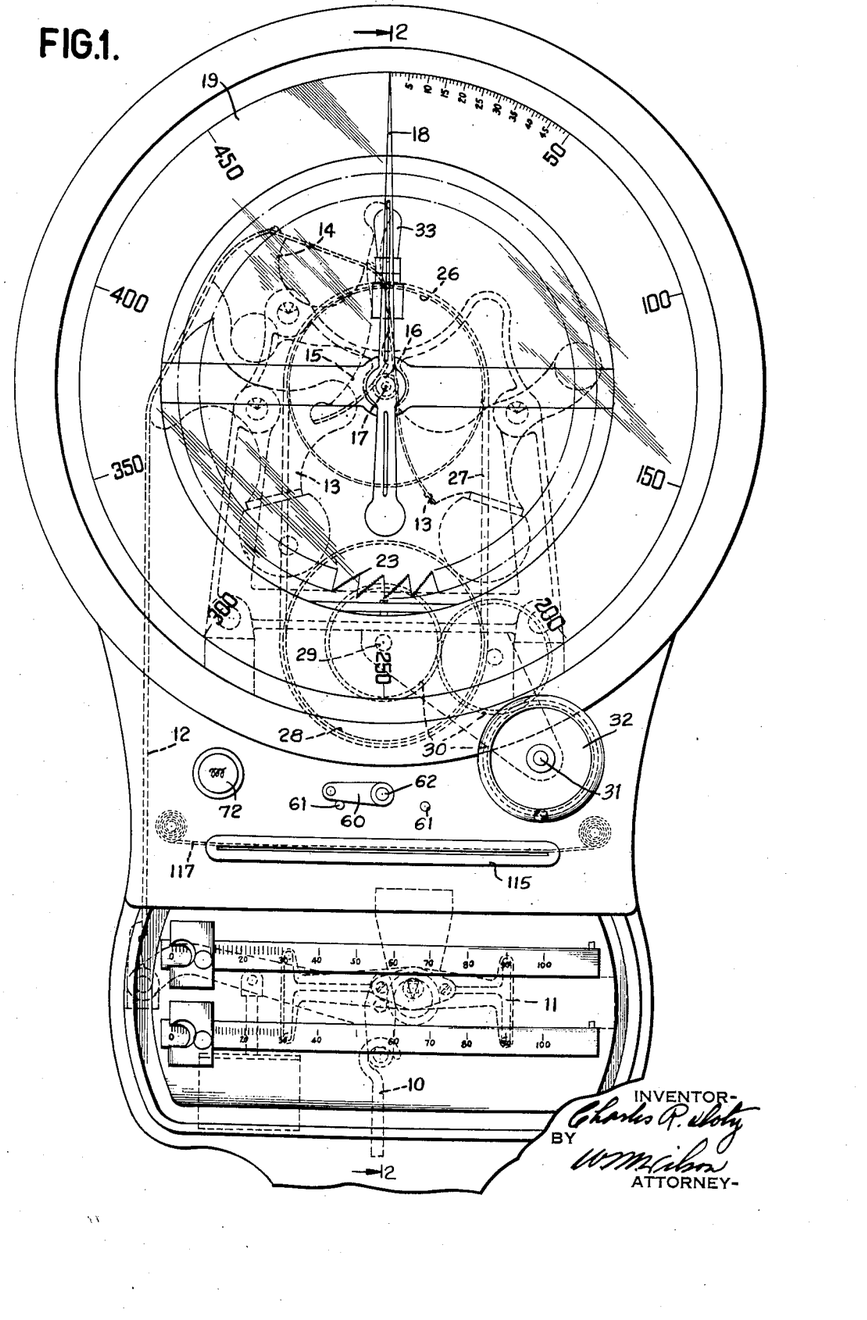
Fig. 1 is a front elevational view of the upper portions of the scale.
Figures 2, 3, 4, 5:
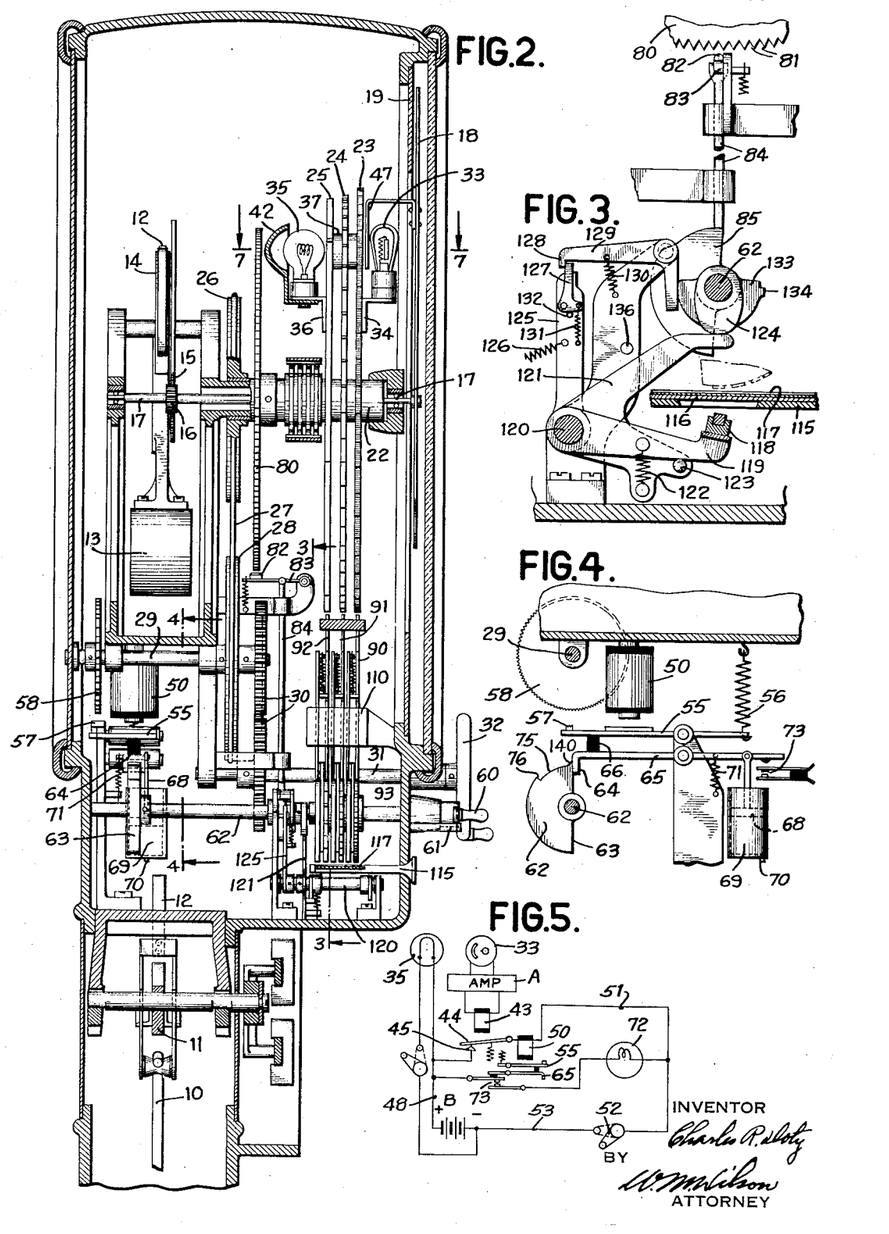
Fig. 2 is a section generally along line 2—2 of Fig. 1.
Figs. 3 and 4 are sections along lines 3—3 and 4—4 respectively of Fig. 2.
Fig. 5 is a circuit diagram.

Referring to Figs. 1 and 2, the weighing mechanism, in general, comprises draft rod 10 for rocking intermediate lever 11 counterclockwise (as viewed in Fig. 1) when a load is applied to the platform (not shown). Movement of lever 11 is transmitted through tape 12 to pendulums 13 and balanced member 14 which carries rack 15 meshed with pinion 16 on shaft 17. Shaft 17 mounts pointer 18 for moving over annular dial chart 19 to indicate the load. The maximum range or capacity of the weighing mechanism is in the instant case 500 lbs.

For controlling recording means from above weighing mechanism, the following is provided:

Mounted concentrically of indicating shaft 17 is sleeve shaft 22 which carries a rigid assembly of stepped control disks 23, 24, and 25. Sleeve shaft 22 carries pulley 26 connected by belt 27 with pulley 28 on shaft 29 driven through gearing 30 from shaft 31. Shaft 31 extends outside the front of the housing and there carries hand wheel 32, operation of which, through aforesaid connections, rotates sleeve shaft 22 and the rigid assembly of stepped disks thereon.

Rotation of the disks is stopped when they reach load position. The load position is determined by the coincidence of a zero position of the disks with the pointer position. When the zero position of the disks reaches the pointer position, the disks are stopped. For this purpose, at the zero position of the disks is arranged a photo cell control to be influenced by the pointer without reactive interference with the operation of the weighing mechanism.

The photo cell control comprises photo cell 33 carried by bracket 34 fixed to a side of disk 23 and lamp 35 carried by bracket 36 fixed to a side of disk 25. Extending through the disks 23, 24, and 25 is tube 37 closed at the end adjacent the lamp by compound condenser lens 38 and closed at the end adjacent the photo cell by an opaque wall 39 having a small tapered opening 40. Normally the light from lamp 35 is directed by reflector 42 secured to bracket 36 towards condenser lens 38 which focuses the light towards opening 40, the rays converging to a point at the end of said opening. From the opening the rays diverge towards cell 33 to activate or energize the cell.

Referring to the circuit diagram, Fig. 5, energization of cell 33 through amplifier A (preferably of the vacuum tube type) in turn energizes relay magnet 43 which attracts its armature 44 to hold control switch 45 open.

Normally, therefore, the cell is energized by rays of light from lamp 35 resulting in opening of control switch 45. The cell is deenergized when the stepped control disks 23, 24, and 25 have their zero position in coincidence with the load indicating pointer 18. To deenergize the cell, the light from lamp 35 is blocked when the zero position of the disks reaches the pointer position by a narrow finger 47 having inclined sides, which is secured to the back of the pointer. Finger 47 prevents the light from reaching cell 33. Accordingly, armature 44 of the relay 43 drops to close control switch 45.

Referring to Fig. 5, closing of switch 45 completes a circuit from the + side of battery B, through line 48, switch 45, magnet 50, line 51, hand switch 52, and line 53 to the − side of the battery.

Referring to Figs. 2 and 4, magnet 50 when energized attracts its armature lever 55 against resistance of spring 56 to move the toothed nose 57 of the lever into locking engagement with a toothed disk 58 to stop shaft 29 carrying the disk. Shaft 29 is in the driving train between hand wheel 32 and sleeve shaft 22 and when it is stopped causes further rotation of the stepped disks by operation of hand wheel 32 to cease.

Disks 23, 24, and 25 translate the load into mechanical step equivalents, the smallest steps on disk 23 representing one-half pound divisions, the steps on disk 24 representing ten pound divisions, and the steps on disk 25 representing hundred pound divisions. Recording is effected under control of the steps of said disks when a handle 60 at the front of the scale is operated. The handle is movable back and forth through a stroke of 180 degrees defined by pins 61. Handle 60 is fast to shaft 62 which carries a locking disk 63 engaged by a downwardly bent finger 64 on a lever 65 underlying armature lever 55 of magnet 50 and separated therefrom by a block 66 secured to lever 55.

It is not desirable to operate handle 60 until the stepped disks have been definitely and correctly located at the load position. These are conditions under which the stepped disks may be incorrectly set and under such conditions, handle 60 should not be released for operation.

A setting of the stepped disks by operation of hand wheel 32 is completed when the hand wheel is locked against operation by engagement of teeth 57 of lever 55 with toothed disk 58. Should the finger 64 be released from disk 63 simultaneously with operation of lever 55 to lock disk 58, then handle 60 would be released, causing the stepped disks to be retained in position, and produce a wrong record if the stepped disks have been incorrectly or only momentarily set.

Some of the conditions under which the disks 23, 24, and 25 are incorrectly or momentarily set are given below. If the disks are not at zero position when the weighing operation begins, the pointer 18 will pass the photo cell control on its way to the load point, finger 47 will momentarily intercept the light to cell 33, the cell will be deenergized, switch 45 will close, and magnet 50 will energize to lock the disks in position.

Again, the scale may not have come to equilibrium and pointer 18 may be oscillating when the stepped disks are moved to the pointer by the hand wheel 32. Accordingly, the photo cell 33 will be deenergized at an indeterminate point of oscillation of the pointer 18 and magnet 50 will be energized to lock up the operating means for the stepped disks.

Another possibility is that the scale load may be varied after the disks have been set by hand wheel 32. A resetting of the disks would then be necessary. Should handle 60 be immediately operative when hand wheel 32 becomes inoperative, then resetting of the stepped disks would be prevented.

Under conditions such as above, the setting of the disks 23, 24, and 25 is either momentary or incorrect and time should be allowed to permit correct setting of the disks to a definite point accurately corresponding to the true load before handle 60 becomes operative to cause a record of the load to be made under control of the disks.

To provide a time lag between setting of the stepped disks and release of handle 60 for operation will give the operator an opportunity to reset the disks if not correctly or only momentarily set and will insure that the disks are at the true load point with the scale in equilibrium or at rest before handle 60 is operative to cause a record to be made.

To release handle 60 after a lapse of a prescribed interval following setting of the stepped disks, lever 65 which is provided with locking finger 64 has pivotally suspended therefrom the dash pot plunger 68 moving within a cylinder 69, preferably of the pneumatic type with an adjustable vent 70. When magnet 50 attracts lever 55, the action of the lever is practically instantaneous and disk 58 is immediately locked to set disks 23, 24, and 25. Lever 65 which underlies lever 55 is urged to follow the latter by a light spring 71 but due to the retarding effect of dash pot 69, the movement of lever 65 is delayed for a prescribed interval which may be varied by adjustment of vent 70. After the prescribed interval, the lever 65 succeeds in moving into engagement with block 66 of lever 55 and is thereby arrested. When this occurs, finger 64 releases disk 63 on shaft 62 and handle 60 is ready for operation.

In order to inform the operator that handle 60 may now be operated, a signal lamp 72 at the front of the scale (see Fig. 1) lights up. The circuit for the lamp (see Fig. 5) is through a pair of contacts 73. These contacts (see Fig. 4) are closed by lever 65 simultaneously with release of finger 64 from disk 63 when the lever has reached its limit of movement in a clockwise direction.

To further insure accuracy of operation, the first 45 degree movement of the handle 60 on its forward stroke is idle so far as effecting recording operations is concerned and should any change in the scale equilibrium or load condition occur in this period to render the setting of the stepped disks inaccurate, then the handle 60 will be locked and the stepped disks released for a resetting by hand wheel 32. To lock up the handle 60 at the end of its initial 45 degree movement, under above conditions, the disk 63 is formed with a recess 75 terminating at the 45° point of the disk in a shoulder 76. Should the coincidence between finger 47 of load pointer 18 and the photo cell control be destroyed, then magnet 50 will be deenergized, and spring 56 will instantly rock both levers 55 and 65 counterclockwise (as viewed in Fig. 4) thus releasing wheel 58 and interposing finger 64 in the path of shoulder 76 of the disk 63. At the same time the contacts 73 will break and lamp 72 will be extinguished to indicate that the handle 60 is not to be moved further forward. When the stepped disks are reset or the scale equilibrium restored, then in the same manner as previously explained, disk 58 will be locked and handle 60 following a prescribed interval released for operation as indicated by the lighting of signal lamp 72.

When the handle 60 is locked up at the end of its initial 45 degrees of movement, the operator should return it to the beginning of its forward stroke. This will enable the first 45 degrees of the handle movement to again sense the location of locking finger 64 to make sure that the setting of the disks has not been changed after the operation of the handle started.

After the initial 45° movement of handle 60, it may safely be assumed that a correct setting of the stepped disks has been obtained. The operation of handle 60 will then be completed and during this operation the hand wheel 32 and the stepped disks will be locked independently of the photo cell control, so that the controlling load on the scale may be removed and a new load applied without destroying accuracy of the record to be made of the controlling load. To indicate to an observer that the conditions at this time require completion of the forward stroke of handle 60, the signal lamp 72 remains lit although the photo cell control may not be in coincidence with the pointer due to a new load being applied. This result is obtained by the periphery of disk 63 following recess 75 coacting with the lower end of finger 64 to maintain lever 65 in the position to which it has been moved under control of magnet 50. Thus the lever 65 will positively maintain contacts 73 closed to keep lamp 72 lit. At the same time, lever 65 will, through block 66, also maintain lever 55 in raised position with toothed nose 57 in locking engagement with disk 58 to prevent operation of hand wheel 32.

Since the load record is translated into stepped equivalents by disks 23, 24, and 25 with the smallest step of disk 23 representing one-half a pound, it is necessary to accurately aline the disks to the half-pound point of the total weight range nearest to the actual load position of the pointer 18 and of the stepped disks. For this purpose, a toothed disk 80 (see Figs. 2 and 3) is fast to sleeve shaft 22, with teeth 81 spaced apart successive distances corresponding to half-pound increments of load. Coacting with teeth 81 is the rounded nose 82 of a lever 83 pivotally connected to a depending rod 84 which at its lower end bears on a cam 85 fast to shaft 62. During the first 45 degree movement of shaft 62, the cam 85 is arcuately shaped and fails to move the rod 84. After the 45 degree movement and for the remainder of the stroke of the shaft 62, the cam lifts the rod 84 to force the nose 82 of the lever 83 between successive teeth 81 of disk 80. The disk 80 is thus positively locked and alined in an even half-pound position and correspondingly the stepped disks 23, 24 and 25 are similarly locked and alined at an even half-pound point of the total load range of the scale. The flexible belt connection 27 between shafts 29 and 22 yields to permit the slight alining movement of shaft 22 although shaft 29 is still locked against movement.

The total printing range of the scale is 499½ lbs. Accordingly, the hundreds order disk 25 has five steps, each representing a 100 lbs. division of the total load range.

Figures 6, 7:
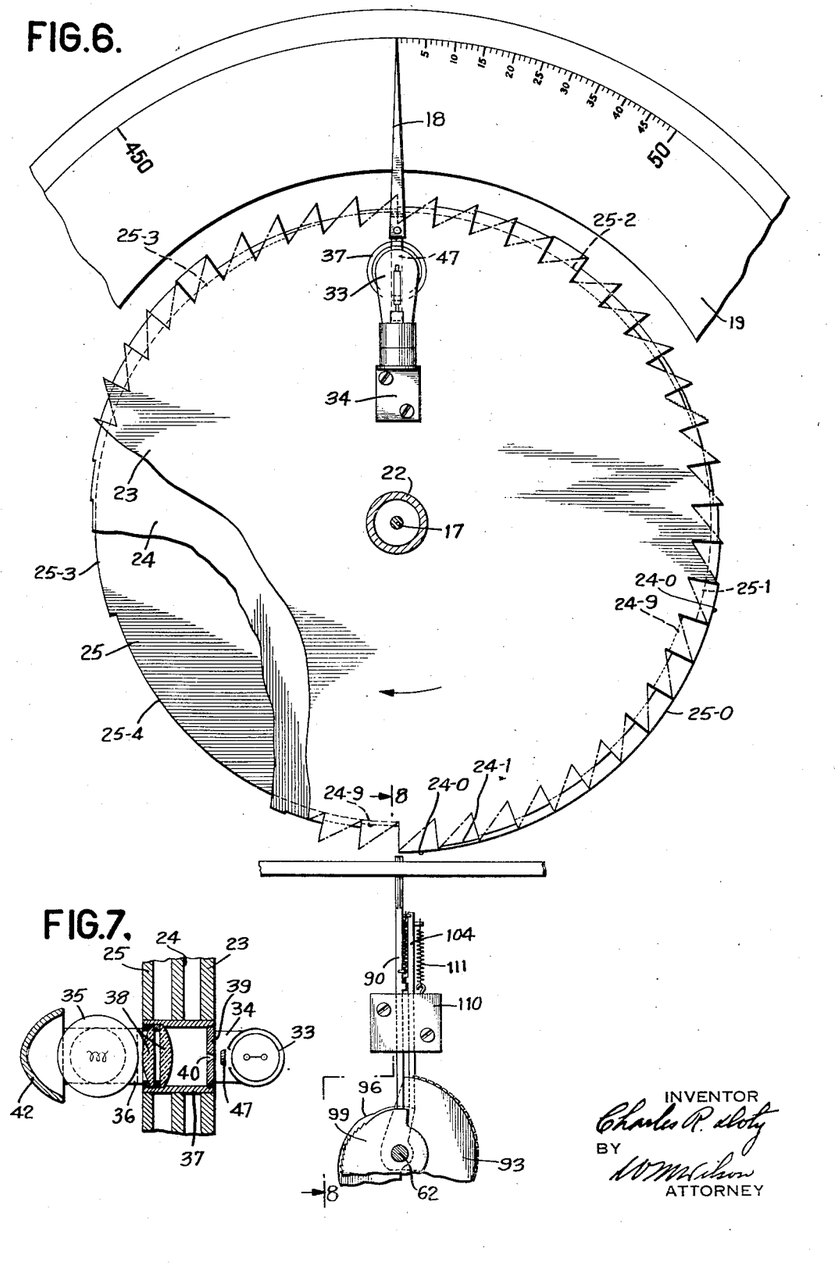
Fig. 6 is an enlarged detail view of the recorder control means and the load registering chart and index.
Fig. 7 is a section along line 7—7 of Fig. 2.
Figure 8:
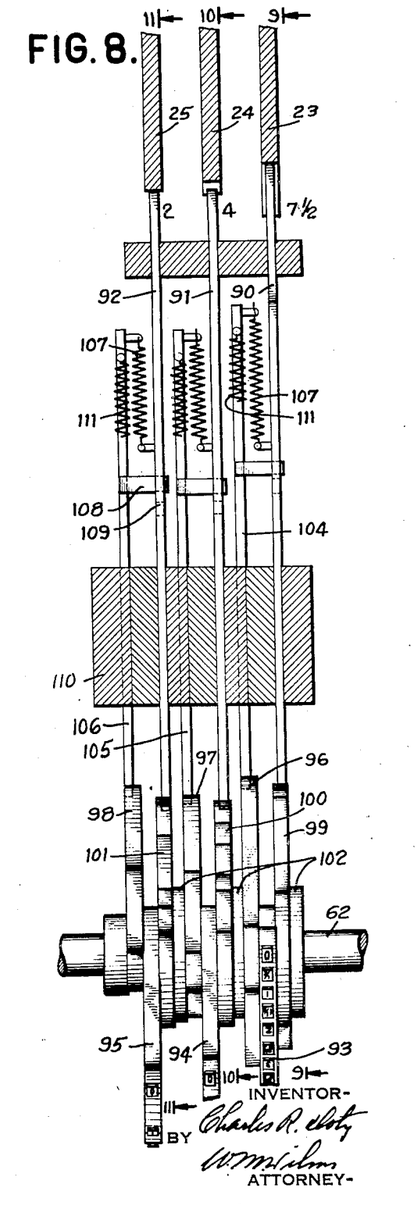
Fig. 8 is a section along line 8—8 of Fig. 6.

Referring to Fig. 6, the steps, in counterclockwise order, are 25—0, 25—1, 25—2, 25—3, and 25—4, with the numerals appended to character 25 representing the hundreds division of the load. The steps are at progressively decreasing radial distances from the axis of movement of the disks. Tens disk 24 has ten steps correlated to each hundreds step of disk 25. The ten steps are, in counterclockwise order, 24—0, 24—1 . . . 24—9, with the number appended to character 24 indicating the tens division of the load. These ten tens steps are also at progressively decreasing radial distances from the axis of the disks. Since there are five hundreds steps, and ten tens steps to each hundreds step, the total number of tens steps is fifty. Each of these fifty tens steps representing the same tens magnitude of the load is at the same radial distance from the axis of the disk.

The lowest order disk 23 is intended to control recording to the half-pound division. Accordingly, disk 23 (see Figs. 6 and 9) has twenty small steps 23—0, 23—½, 23—1, 23—1½ . . . 23—9½ within the field of each tens step of disk 24. Steps 23—0, etc. are at progressively decreasing radial distances from the axis of the disks and steps corresponding to the same magnitude within each field of the tens step are at the same radial distance.

When the disks have been set in accordance with the load, those steps of the disk representing the load will be located directly above sensing pins or feelers 90, 91, and 92, coacting respectively with the steps of disks 23, 24, and 25. For example, with a load of 247.5 lbs. on the scale, the hundreds disk 25 will have step 25—2 above pin 92, tens disk 24 will have a step 24—4 located above pin 91, and disk 23 will have a step 23—7½ above pin 90.

Figure 9:
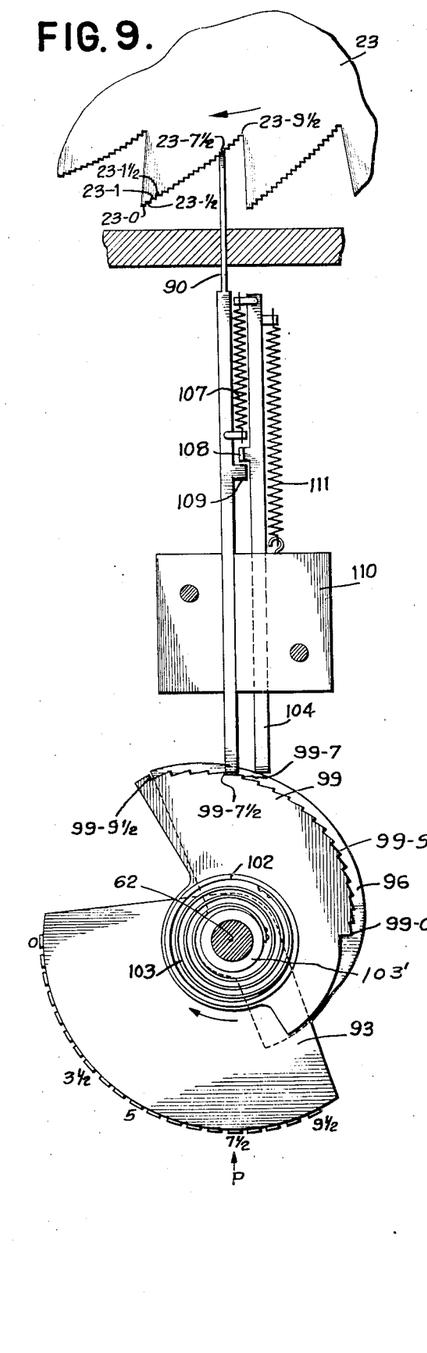
Figs. 9, 10, and 11 are sections along lines 9—9, 10—10, and 11—11, respectively, of Fig. 8.
Figure 10:
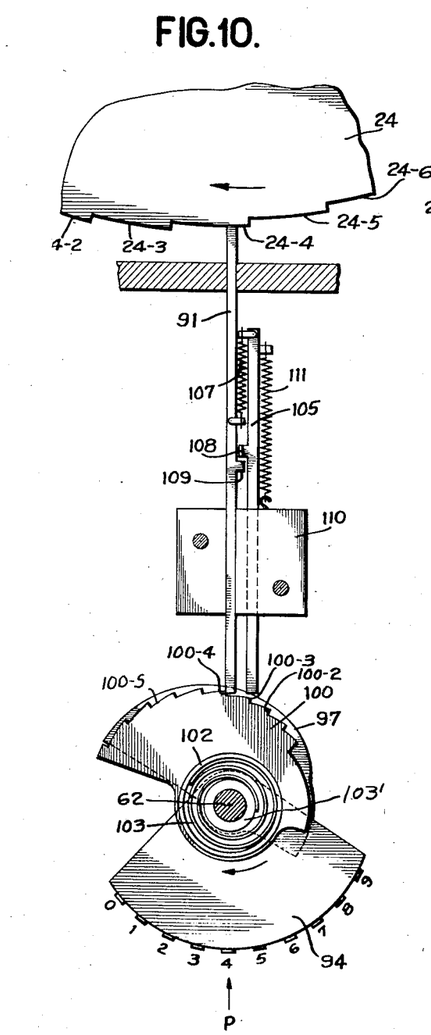
Figure 11:
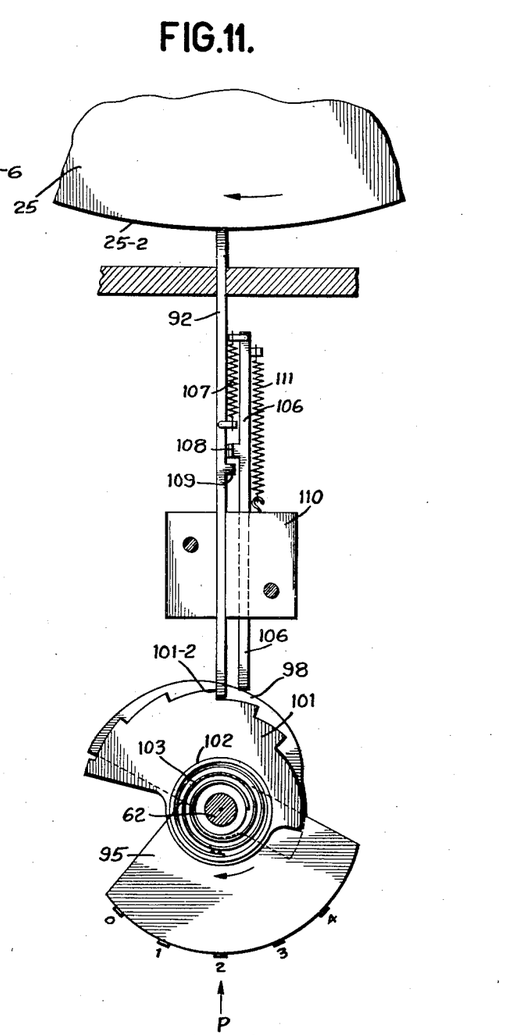

Pins 90, 91, and 92 move into engagement with the steps representing the load to respectively control recording members 93, 94 and 95 which locate type for printing the load at the printing position, indicated by arrow P in Figs. 9, 10, and 11.

Fast to one side of recording members 93, 94, and 95 are cam elements 96, 97, and 98, respectively, while fast to the opposite side of the members are stepped sectors 99, 100, and 101, respectively.

Each of the sectors has a collar 102 extending therefrom which houses a spiral spring 103 connected at its outer end to the inside wall of the collar and at its inner end to a hub 103' fast to the shaft 62. Shaft 62, through springs 103, yieldingly drives each assembly of recording member, cam element, and stepped sector independently of the other assemblies. The assemblies may also be stopped independently of each other in different relative positions while the shaft 62 completes its forward stroke.

Cam elements 96, 97, and 98 are respectively engaged by pins 104, 105, and 106, which may be termed, for convenience, actuating pins. These pins are each yieldingly connected through a spring 107 with sensing pins 90, 91, and 92, respectively. Springs 107 normally hold lugs 108 on the actuating pins engaged with the top of the lugs 109 on the companion sensing pins, as shown in Fig. 6.

All the pins are slidably mounted for vertical movement in a frame piece 110. Springs 111 connecting the actuating pins with frame 110 hold the latter pins in contact with their respective cam elements. The cam elements are spirally curved, their radius vectors gradually increasing in the direction of movement of the recording assemblies during the forward stroke of the handle 60 and its shaft 62. The stepped sectors 99, 100, and 101 are of less height than and generally follow the contour of the associated cam elements. The lower ends of the actuating pins are above the lower ends of the sensing pins. When both pins of a set are free to move upwardly without interference by the stepped disks 23, 24, or 25, then the lower end of the sensing pin just clears the stepped sector while the lower end of the companion control pin is contacting the spiral cam element. However, when a sensing pin has been moved upwardly into engagement with a step on a control disk, then the sensing pin can no longer follow its companion actuating pin upwardly and spring 107 will yield while the recording assembly continues to move and the actuating pin continues to rise stretching spring 107 until the shoulder at the end of the step on the associated stepped sector below the sensing pin encounters the side of the arrested sensing pin. The entire recording assembly will thus be arrested while shaft 62 completes its forward stroke.

Since the first 45 degree movement of shaft 62 is set apart for sensing the position of the stop finger 64, as previously explained, and is not to have any recording control, the cam elements are arcuately shaped for the first 45 degrees of their periphery so that the actuating pins will not rise during this portion of the stroke of shaft 62.

After the cam elements move through 45 degrees, their peripheries gradually rise and lift the actuating pins. Similarly, initial 45 degrees of the stepped sectors are arcuately shaped. While the cam elements begin to lift the control pins at the end of their 45 degree movement, the arc portions of the stepped sectors continue as far as the first shoulder which defines the zero position of a recorder assembly. The sensing pin, however, after the 45 degree point of the stepped sector passes, rises with the associated actuating pin now being raised by its cam element. Should the sensing pin during its rise be stopped by engagement with a zero step on the control disk, then it will encounter the first shoulder of the stepped sector and stop the associated recording member with O type at the printing position P. Between successive shoulders of the stepped segments, the steps are arcuate and do not contact the sensing pins.

The manner in which the control and sensing pins operate to position the recording elements will now be specifically explained with the previously assumed example of a 247½ pound load.

Referring to Fig. 9, since disk 23 has twenty differential steps, representing 0 to 9½ lbs., the stepped sector 99 has twenty corresponding differential steps 99—S terminating in twenty shoulders 99—0, ½, 1 . . . 9½ and type carrier 93 has twenty type for printing 0 to 9½ lbs. Shaft 62 being in motion, through spring 103, it rocks the assembly of recording member 93, cam element 96, and stepped sector 99 clockwise.

The initial 45 degree portion of cam 96 does not lift the actuating pin 104. As soon as this portion passes the control pin, the cam starts to lift the actuating pin and through spring 107 to lift sensing pin 90. The lower end of the pin is raised sufficiently to clear the part of the stepped segment 99 preceding the first shoulder 99—0. The cam 96 continues to rotate and lift the pin 104 to correspondingly lift the sensing pin 90 successively above and clear of the steps 99—S. When pin 90 clears shoulder 99—7, it comes in contact at its upper end with step 23—7½ on disk 23 and is prevented from rising further. The unit recording assembly continues to move, pin 104 rising and stretching spring 107, until the shoulder 99—7½ encounters the left side of the pin 90. This stops the entire unit recorder assembly in the position shown in Fig. 9 with the type for printing 7½ located at printing position P.

Referring to Fig. 10, the tens control disk 24 has ten differential steps and therefore stepped sector 100 has ten corresponding steps 100—S terminating in shoulders 100—0, 1, 2 . . . 9 and recording member 94 has ten type for printing 0 to 9. When sensing, pin 91 is raised by the lifting of the companion pin 105 into contact with step 24—4 of the tens disk, it is unable to rise further and is engaged by shoulder 100—4 of the stepped sector to stop the recording member 94 with type legend 4 at printing position, as shown in Fig. 10.

Similarly, pin 92 of the hundreds order (see Fig. 11) is raised by actuating pin 106 to engage step 25—2 of the hundreds disk 25 and engages the shoulder 101—2 of the stepped segment 101 to stop recording member 95 with type legend 2 at printing position. As control disk 25 has only five differential steps, the sector 101 has five steps and shoulders and recording member 95 has five type 0 to 4.

The hundreds, tens, and units recording members are now located in position to print 247½ which is the load on the scale.

The advantages of the recording control just described will now be briefly outlined. The first advantage is that slight differential distances between successive steps of the control disks are converted into materially larger differential movements of recording members. This permits a great many small steps to be provided on a control disk thus translating the load to a smaller and therefore more accurate division. The recording member may correspondingly carry a correspondingly large number of type to print the smaller fractions of the load yet have a movement from one type to another multiplied with respect to the differentials between the steps of the control disk so that one type will not be too close to the adjacent one to interfere with a clear imprint taken from the latter. For example, the units disk 23 has twenty very small differential steps, the sensing pin 90 has correspondingly small differential motion, and the recording member 94 has a rocking movement of about four times the differential motion of the sensing pin to locate its twenty type successively at printing position. The steps of the stepped sectors may be made longer if the stroke of shaft 62 is increased to control a still larger differential movement of the recorder from the same small differential motion of the sensing pins.

Another advantage of the described construction is that the recording assemblies are brought to a gradual stop so that the engagement of the stepped sectors with the sensing pins is effected without imparting shock to the pins tending to bend them and to thrust them violently against the steps of the control disk which would result in injury thereto, particularly to the fine steps of disk 23.

To understand the manner in which the recorder assemblies are gradually arrested, reference may be had to Fig. 10, showing the tens order. When pin 105 raises sensing pin 91 sufficiently to clear the shoulder 100—3, the sensing pin engages the step 24—4 of the control disk 24 and is held thereby against a further rise. The recording assembly, however, continues to rotate and cam 97 continues to lift pin 105. However, the lower end of spring 107 is now stationary, being anchored to the sensing pin which is being held against movement and therefore the rise of pin 105 will be resisted by the spring, which in turn transmits this resistance as a frictional braking force applied to cam 97. The resistance of the spring increases as the cam 96 continues to rotate and raise pin 105 to stretch the spring further. Accordingly, by the time shoulder 100—4 encounters the side of pin 91, the motion of the recording assembly has been considerably decelerated.

Still another advantage is that the recording assemblies are positively arrested by the sensing pins at accurately located and sharply defined points of the movement of the assemblies. This follows from the fact that the shoulders terminating the steps of the stepped sectors which engage the sensing pins to stop the recorder assemblies may be accurately spaced and machined flat to provide flush contact with the flat sides of the sensing pins and cause the assemblies to stop without play, the springs 103 holding the shoulders firmly in contact with the pins.

By reason of the fact that the steps themselves between the shoulders have no contact with the sensing pins, the surface of the steps need not be finished or made with any nicety of manufacture.

Still another advantage is that the sensing pins are never positively thrust against the steps of the control disks but are only yieldingly engaged therewith by springs 107 even when contacting a shoulder of the stepped sector. The possibility of the pins damaging the stepped control disks or bending them is therefore reduced to a minimum.

Of the 180 degrees of movement of shaft 62, the first 45 degrees has no effect on the sensing and actuating pins and the next 125 degrees is required to move the recording assemblies the maximum distance which may be necessary if the 9 type is to be located at printing position. This leaves 10 degrees for printing the record, feeding the inking ribbon, or other auxiliary operations which may be required.

Referring to Figs. 1, 2 and 3, the means for taking an impression of the load from recording members 93, 94, and 95 comprises a chute 115 to receive a card 116 below an inking ribbon 117 and above the hammer end 118 of an arm 119 freely rotatable on a shaft 120. Fast to shaft 120 is a bell crank lever 121 connected by a light spring 122 to arm 119, the spring holding the arm 119 in contact with a stud 123 on the lever 121. The upper end of the bell lever is engaged by a cam 124 on shaft 62 at the beginning of the forward stroke of the shaft and when so engaged is in the position shown in Fig. 3 in which through spring 122 it holds the arm 119 and hammer 118 retracted from the record card 116.

Also fast to shaft 120 is an arm 125 normally urged to the left (as viewed in Fig. 3) by a spring 126 but held against such movement by engagement of a pawl 127 thereon with the nose 128 of a latch lever 129. A spring 130 connected to lever 129 holds it in latching engagement with pawl 127. Pawl 127 is pivoted to arm 125 and urged clockwise by spring 131 into contact with a lug 132 on the arm so that it will not yield under the pressure exerted on arm 125 by spring 126. The rear end of latch lever 129 rides on a cam 133 fast on shaft 62 and which is arcuately shaped until the last ten degrees in which it is provided with a lug 134. Fig. 3 shows the initial positions of the above parts. Since bell lever 121 is fast to shaft 120 which is maintained in the initial position by the latching of arm 125 also fast to the shaft, the bell lever is unable to follow cam 124. When the shaft has moved 170 degrees, during which period the type members are set, the low point of cam 124 is above and clearly spaced from the bell lever 121 which remains in initial position. After shaft 62 has moved 170 degrees, the lug 134 on cam 133 engages the latch lever 129 and rocks the nose 128 thereof free of pawl 127, releasing arm 125 for actuation to the left by spring 126. Shaft 120 and bell lever 121 are thus rocked counterclockwise and stud 123 on the lever positively moves the arm 119 upwardly. Before the hammer 118 reaches the record card 116, lever 121 is stopped by engagement with a fixed pin 136. Arm 119, however, being rotatable on shaft 120 is carried further by its own momentum to strike the card 116 sharply and produce a clear imprint thereon from the type and is immediately retracted by spring 122.

On the return stroke of shaft 62, the record taking means is restored to initial position. Cam 124 on the return stroke engages bell lever 121 to rock it clockwise, thereby through shaft 120 moving arm 125 to the right. The pawl 127 is permitted by spring 131 to yield counterclockwise in order to pass the nose 128 of latch lever 129 and be relatched thereby.

The return stroke of shaft 62 returns the recording assemblies to initial position, meanwhile releasing the sensing pins from engagement with stepped disks 23, 24, and 25 and leaving the latter free for another setting by operation of hand wheel 32.

An inclined edge 140 on locking disk 63 cams the locking finger 64 upwardly on the return stroke and permits the disk to move to its initial position. The finger 64 and lever 65 are returned by spring 56 acting through armature lever 55 to the position shown in Fig. 4, and the circuit through the lamp 72 is broken.

A brief summary of the operations follows:

A load is applied to the scale, moving pointer 18 to a position corresponding to the load, which is indicated on chart 19. The operator now rotates hand wheel 32 to rotate sleeve shaft 22 carrying stepped disks 23, 24, and 25 which are adapted to translate the load into differential step equivalents. When the disks have been moved to a position corresponding to the load, a finger 47 on pointer 18 intercepts a beam of light directed from lamp 35 to photo cell 33, both carried by the disks. The cell being deenergized, relay 43 permits switch 45 to close and complete a circuit through magnet 50 which operates lever 55 to arrest disk 58 on shaft 29 geared to hand wheel 32. The latter is now locked and cannot move the stepped disks which are now at the load point. After the lapse of a prescribed interval to make sure that the setting of the disks has been correct, the lever 65 unlatches the recording shaft 62 and causes signal lamp 72 to light up and indicate that handle 60 on shaft 62 is ready for operation. During the first 45 degrees of the forward stroke of the handle, the recess 75 in disk 63 on shaft 62 moves beneath finger 64 on lever 65 and if the finger has dropped during this interval because of a wrong setting of the stepped disks, it will engage shoulder 76 at the end of the recess and stop operation of shaft 62 until the hand wheel 32 is again operated to correctly reset the disks.

After shaft 62 moves 45 degrees, the cam elements 96, 97, and 98, raise actuating pins 104, 105, and 106 to move the sensing pins 90, 91, and 92 in engagement with the steps on disks 23, 24, and 25 representing the load. The recording members 93, 94, and 95 are stopped by the sensing pins in positions corresponding to the load. The final portion of the forward stroke of shaft 62 causes hammer 118 to effect printing by the recording members on a card 116 inserted in chute 115 at the front of the scale.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the invention therefore to be limited only as indicated by the scope of the following claims.

What is claimed is as follows:

1. In a machine including weighing mechanism; the combination of recording means including a movable device having stop shoulders extending progressively increasing distances from the device, a cam movable in synchronism with said device, load translating means movable in accordance with operation of the load and having an element representative of the load, a sensing member, and means operated by said cam for moving said sensing member progressively above said stop shoulders during movement of the cam and device until said member engages aforesaid element and is arrested thereby to intercept one of the shoulders of the device to differentially set the latter in accordance with the load.

2. In a machine including weighing mechanism; the combination of recording means including a rotatable device having peripherally spaced stop shoulders at progressively increasing radial distances from the axis of the device, a spiral cam rotatable in synchronism with said device, means movable in accordance with operation of the weighing mechanism and having an element representative of the load, a sensing member progressively raised by said cam above the successive stop shoulders until the sensing member engages said element and is arrested thereby to intercept the shoulder following the last one above which it has been raised to thereby set the rotatable device in accordance with the load.

3. In a machine including weighing mechanism; the combination of recording means including a rotatable device having peripherally spaced stop shoulders at progressively increasing radial distances from the axis of said device, a cam rotatable in synchronism with the device and having a contour of increasing radii generally following the radii of the stop shoulders, a disk settable in accordance with the load and having elements for translating the load into differential mechanical equivalents, a sensing finger for sensing the elements, a companion actuating finger yieldingly connected to the sensing finger and operated by said cam to progressively and yieldingly actuate the sensing member above said stop shoulders until the sensing member engages a disk element and is arrested thereby to intercept the stop shoulder following the last one above which it has been raised to thereby set the rotatable device in accordance with the load.

4. In a machine including load weighing mechanism; the combination of a load translator settable in accordance with operation of the weighing mechanism, a recording device including means having a stop shoulder, an actuator for operating the device, a sensing member movable to engage the translator and stopped thereby in position to intercept said shoulder and positively arrest operation of the recording device, a movable actuating member, an impositive driving connection between the actuating member and the sensing member for moving the sensing member into contact with the translator, and means movable in synchronism with the first-mentioned means and operatively connected thereto for moving the actuating member.

5. In a machine including load weighing mechanism; the combination of a load translator comprising a rotatable disk having peripherally spaced elements representative of the load and having a zero position relative to the weighing mechanism, a source of wave energy, a device sensitive to wave energy emanating from the source, an element for varying the flow of radiant energy from the source to said device upon the disk arriving at said relative zero position, electrical means controlled by the said device for stopping the rotation of the disk upon aforesaid variation of energy flow to said device, recording means, and an actuator for differentially operating the recording means under control of the elements of said disk.

6. In a machine including load weighing mechanism; the combination of a load translator comprising rotatable disks of different denominational orders having a common zero position relative to the weighing mechanism, each disk having peripherally spaced elements for interpreting its denomination of the load as mechanical equivalents, an actuator for rotating the disks, a photo cell device controlled by operation of the weighing mechanism for stopping operation of the disks by the actuator upon the disks reaching aforesaid relative zero position, differentially operable recording elements of different denominational orders, and control members, one for each disk for sensing the elements of said disk and controlling operation of the recording elements in accordance with the interpretation of the load by the disk elements.

7. In a machine including load weighing mechanism; the combination of a load translator including a set of rigidly connected and commonly rotatable stepped disks, each disk representing a different denomination of the load and having differentially arranged steps for interpreting its denomination of the load as mechanical equivalents, a photo cell and a source of energy therefor commonly carried by said disks, an element for varying the energy flow from said source to change energization of said device upon the disks reaching a position corresponding to the load, electrical means controlled by said cell upon its change in energization for interrupting rotation of the stepped disks, recording means, an actuator for differentially actuating the recording means, sensing members, one for each disk, for engaging the steps of its disk and differentially set thereby and rotatable elements operatively connected to the recording means and engaged by the sensing members to interrupt operation of the recording means by the actuator after movements of the recording means proportional to the differential setting of the sensing members.

8. In a machine including load weighing mechanism; the combination of a load translator including a series of stepped disks arranged side by side and rigidly connected for common rotation, a tube passing through said disks and secured thereto, a source of wave emanations carried by the disks adjacent one end of the tube, a condenser lens at said end of the tube, an opaque wall at the other end having a hole towards which the lens converges the wave emanations from said source, a photo cell carried by the disks in front of the opaque wall and energized by the wave emanations passing through said hole, an element interposed by the weighing mechanism between the cell and the hole to intercept flow of wave energy to said cell and deenergize the latter, operating means for rotating the disks, a magnet, means for energizing the magnet upon deenergization of the cell, a lock operated by the magnet to interrupt operation of the disks by said operating means, recording members, and controls for engaging the steps of said disk to differentially set the recording members in accordance with the interpretation of the load by said steps.

9. In a machine including load weighing mechanism; the combination of a load translator comprised of separate parts, each for translating a different denominational order of the load, an actuator for operating the load translator, means for sensing the position of the weighing mechanism, a device controlled by said means for automatically stopping operation of the translator upon the latter being set in accordance with the load, recording means, means for operating the recording means under control of the translator and including provisions for moving the translator parts as a rigid unit independently of the aforesaid actuator to an even load point corresponding to the smallest equivalent step of the translator.

10. In a machine including load weighing mechanism; the combination of a load translator, driving means other than and separate from the weighing mechanism for moving the translator to a position corresponding to the load, a recording device, driving means for actuating the recording device under control of the translator, means for locking the driving means of the recording device during operation of the translator driving means, and means automatically controlled by the weighing mechanism upon the translator reaching the load position for unlocking the driving means of the recording device and automatically rendering the translator driving means ineffective to drive the translator.

11. In a machine including load weighing mechanism; the combination of a load translator, driving means other than and separate from the weighing mechanism for moving the translator to a position corresponding to the load, a recording device, driving means for differentially setting the recording device under control of the translator according to the load, means for locking the driving means of the recording device during operation of the translator driving means, and automatic means automatically set in operation under control of the weighing mechanism upon the translator reaching the load position for automatically stopping the actuation of the translator by its driving means and for releasing the driving means of the recording device for operation.

12. In a machine including weighing mechanism; the combination of a device for sensing the position of the weighing mechanism, means for moving the device independently of the weighing mechanism to load sensing position, auxiliary mechanism, an intercontrol between the device and the auxiliary mechanism, and means for delaying effective operation of the intercontrol until after a lapse of time following sensing of the weighing mechanism by said device.

13. In a machine including weighing mechanism; the combination of a load translator, an atcuator for moving the translator, a device for interrupting movement of the translator when the latter has been moved to a position corresponding to the load, recording mechanism, means for setting the recording mechanism under control of the translator, a lock for restraining operation of the setting means, means for releasing the lock from said setting means, and a device for delaying said release for an interval following the arrival of the translator at such load position.

14. In a weighing machine including a device operated in accordance with the load; the combination of auxiliary mechanism, means for differentially setting the auxiliary mechanism under control of said device according to the load, a lock for initially preventing operation of the setting means while the device is moving to load position, means for releasing the lock from said operating means after the device reaches load position, and provisions for restoring locking coaction between the lock and setting means after the latter has started operation and before it effects setting of the recording mechanism upon the device departing from load position.

15. In a machine including load weighing mechanism; the combination of a plurality of denominational order stepped load translating members settable under control of the weighing mechanism according to the load, each translating member having control steps of different effective heights to represent different values within the order of said latter member, sensing devices, one for each member, each device including a sensing part and a stop part, means for moving each device through a forward stroke for engaging the sensing part with a control step of the associated translating member to thereby arrest the stop part at a differential point of said forward stroke directly by and upon engagement of said sensing part with the control step, and auxiliary mechanism including movable denominational order elements, each correlated to one of said sensing devices and each having stop shoulders progressively increasing in effective height in the direction of movement of said element, and means for differentially moving the elements until they are arrested in differential positions corresponding to the load by engagement of a shoulder of each of the elements with the stop part of the associated sensing device while the sensing part of said device is still engaged with said control stop and is maintaining its stop part at its differential point of arrest.

16. The machine such as defined in claim 15, said means for moving the sensing devices and said means for moving the denominational order elements being synchronously and coincidentally operated.

17. The machine as defined in claim 15, the sensing part and the stop part of each said device being respectively the forward and rear ends of a rigid finger.

18. The machine as defined in claim 15, said sensing device including yieldable means for maintaining the sensing part of each said device in engagement with the control step of the associated member and thereby maintaining the stop part in its differential position of arrest.

CHARLES R. DOTY.